US008074027B2

(12) United States Patent
Bradshaw et al.

(10) Patent No.: US 8,074,027 B2
(45) Date of Patent: Dec. 6, 2011

(54) MULTI-LEVEL READ CACHING FOR MULTIPLEXED TRANSACTIONAL LOGGING

(75) Inventors: Dexter P. Bradshaw, Duvall, WA (US); William R. Tipton, Seattle, WA (US); Dana Groff, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 565 days.

(21) Appl. No.: 11/633,248

(22) Filed: Dec. 4, 2006

(65) Prior Publication Data

US 2008/0133615 A1  Jun. 5, 2008

(51) Int. Cl.
*G06F 12/00* (2006.01)
(52) U.S. Cl. .. 711/122; 711/118; 711/220; 711/E12.017
(58) Field of Classification Search .................. 711/122, 711/118; 707/202
See application file for complete search history.

(56) References Cited

U.S. PATENT DOCUMENTS

| | | | |
|---|---|---|---|
| 5,287,501 A | 2/1994 | Lomet | |
| 5,455,946 A | 10/1995 | Mohan et al. | |
| 5,758,149 A | 5/1998 | Bierma et al. | |
| 5,809,562 A * | 9/1998 | Gaskins et al. | 711/207 |
| 5,812,996 A | 9/1998 | Rubin et al. | |
| 5,832,508 A | 11/1998 | Sherman et al. | |
| 5,903,907 A | 5/1999 | Hagersten et al. | |
| 6,321,234 B1 | 11/2001 | Debrunner | |
| 6,356,270 B2 * | 3/2002 | Pentkovski et al. | 345/530 |
| 2003/0051070 A1 * | 3/2003 | Shappir et al. | 709/328 |
| 2003/0226058 A1 * | 12/2003 | Miller et al. | 714/15 |
| 2003/0233389 A1 | 12/2003 | Bradshaw et al. | |
| 2004/0103123 A1 * | 5/2004 | Bradshaw | 707/202 |
| 2005/0289169 A1 | 12/2005 | Adya et al. | |
| 2006/0053339 A1 | 3/2006 | Miller et al. | |
| 2006/0143241 A1 | 6/2006 | Bradshaw | |
| 2007/0073974 A1 * | 3/2007 | Averill et al. | 711/133 |

OTHER PUBLICATIONS

Batschulat, et al., "The UFS File System", Date: Jun. 15, 2006, http://www.informit.com/content/images/0131482092/samplechapter/mcdougal_ch15.pdf.
Kagel Art S., "Tuning Informix Dynamic Server and Your System for Optimum Performance", 1998, vol. 8, Issue 3,www.peterschmidt.com.
"Sequential Transactions with Caching" (Principles of Computer Systems, 2002), Handout 19, 9 pages.

* cited by examiner

*Primary Examiner* — Reginald Bragdon
*Assistant Examiner* — Larry Mackall
(74) *Attorney, Agent, or Firm* — Mayer & Williams P.C.

(57) ABSTRACT

A transactional logging service is provided to user-mode and kernel-mode log clients by utilizing a marshalling area to buffer a set of log records that a log client assembles into a log stream. Disk I/O (input/output) functionality is then separately brokered using a kernel-mode address space for a single dedicated physical log, or virtual logs multiplexed to a single log, which is written to stable storage that contains log records from across all of the log streams. Physical log writes are handled by a shared log flush queue and physical log reads are provided by a file system cache that underlies the service. A multi-level cache hierarchy is utilized when a log client needs to access a log record. A series of caches are queried in order of increasing latency until the targeted log record is located. The target log record is only read from disk in the event that it missed at each cache in the hierarchy.

3 Claims, 11 Drawing Sheets

MULTI-LEVEL READ CACHING FOR MULTIPLEXED TRANSACTIONAL LOGGING

BACKGROUND

Transactional logging involves maintaining a transactional log that durably records a time serial history of transactions in a system. The transactional log provides information for restoring a system to a particular state in time prior to a system failure. A transactional logging system must be able to reliably and accurately restore logging functionalities after such a system failure. Most conventional transactional logging systems implement a read cache in the user-address space to help reduce the latency of the round-trip to disk to read log records. Typically, read caches exploit the inherent sequential nature of logs and pre-fetch large amounts of data into their read caches. In many traditional systems multiple log clients (i.e., recipients of a logging service) exist and each log client consumes virtual memory and working set quota which equal the size of its read cache. In addition, because the read cache is stored in the application's address space it has to be replicated for every open instance of a log file or stored in user-mode shared memory.

While many current transactional logging systems are typically very robust and achieve a satisfactory performance level, the read caches utilized for multiple log clients can consume a significant amount of resources. Overall performance of the computing environment in which a multi-client transactional system is operating can be substantially impaired as a result of paying for the overhead and memory costs associated with the read caches.

This Background is provided to introduce a brief context for the Summary and Detailed Description that follows. This Background is not intended to be an aid in determining the scope of the claimed subject matter nor be viewed as limiting the claimed subject matter to only those implementations that may solve any or all of the disadvantages or problems presented above.

SUMMARY

A transactional logging service is provided to user-mode and kernel-mode log clients by utilizing a marshalling area to buffer a set of log records that a log client assembles into a log stream. Disk I/O (input/output) functionality is then separately brokered using a shared kernel-mode address space for a single dedicated physical log, or virtual logs multiplexed to a single log, which is written to stable storage that contains log records from across all of the log streams. Physical log writes are handled by a shared log flush queue, and physical log reads are provided by a file system cache that underlies the service.

A multi-level cache hierarchy is utilized when a log client needs to access a log record. A series of caches are queried in order of increasing latency until the targeted log record is located. These caches include, respectively: 1) the current read buffer in the marshalling area; 2) the current write buffer (if any) in the marshalling area to which log records are being written; 3) the shared log flush queue; and, 4) the file system cache. The target log record is only read from disk in the event that it is missed (i.e., is not located) at each cache in the hierarchy.

In various illustrative examples, a kernel-mode driver called a "Common Log File System" ("CLFS") driver manages the log flush queue to thereby implement a single physical log file. A set of log records is multiplexed from log streams from the marshalling buffers from one or more log clients into the shared log flush queue and then flushed to the single physical log file on stable storage. The CLFS driver interacts with user-mode and kernel-mode application programming interfaces ("APIs") that respectively provide log file objects and log handles for the clients to marshal log records into virtual logs that form the log streams. In addition, the CLFS driver maps non-contiguous log sequence numbers ("LSNs") used to uniquely identify log records from the physical log to a contiguous address space in the file system cache. The mapping is performed by determining an offset (in bytes) between a reference point in the physical log called a cache base LSN and a log record of interest.

The present multi-level read caching for transactional logging provides read and write log caching that appears to the log clients as a conventional transactional logging system, with all of the same functionality. However, available memory (e.g., virtual memory) is more efficiently and economically utilized because only logs being actively read or queued in the shared log flush queue consume memory which substantially reduces the size of the overall log cache footprint. Delegation of physical log reads to the underlying file system cache advantageously enables further memory optimization at the system-level to improve overall computer system performance while still maintaining the benefits of log caching. In addition, after a system recovery, the cache hierarchy is repopulated in bottoms-up order so that the transactions in the logs cached in the file system cache are handled first which improves system recovery performance.

This Summary is provided to introduce a selection of concepts in a simplified form that are further described below in the Detailed Description. The benefits and advantages noted in this Summary are not intended to limit the claimed subject matter to only those implementations that contain those benefits or advantages. In addition, this Summary is not intended to identify key features or essential features of the claimed subject matter, nor is it intended to be used as an aid in determining the scope of the claimed subject matter.

DETAILED DESCRIPTION

Transactional systems include database management systems, messaging systems such as store-and-forward systems, transaction managers, transaction files systems, and online transactional processing systems. A single logical operation on data in such systems is called a transaction. Key transactional processing properties are commonly identified by the acronym "ACID" which stands for Atomicity, Consistency, Isolation, and Durability. Conforming with ACID properties generally ensures that transactions are processed reliably and durably.

One method for implementing the ACID properties involves the use of a transactional log. A transactional log may comply with the popular ARIES (Algorithms for Recovery and Isolation Exploiting Semantics) in which case it is called an "ARIES log." Typically, ARIES implements write ahead logging (WAL) where any change to an object is first recorded in the log, and the log is written to stable storage (e.g., a disk) before the changes to the object are implemented. Thus changes to the object and transactions in general are capable of being rolled back or undone. Thus ARIES logs are commonly utilized in system recovery and restoration situations so that transactional systems may be brought back to the state in which they were operating before a system failure.

Figure 1:
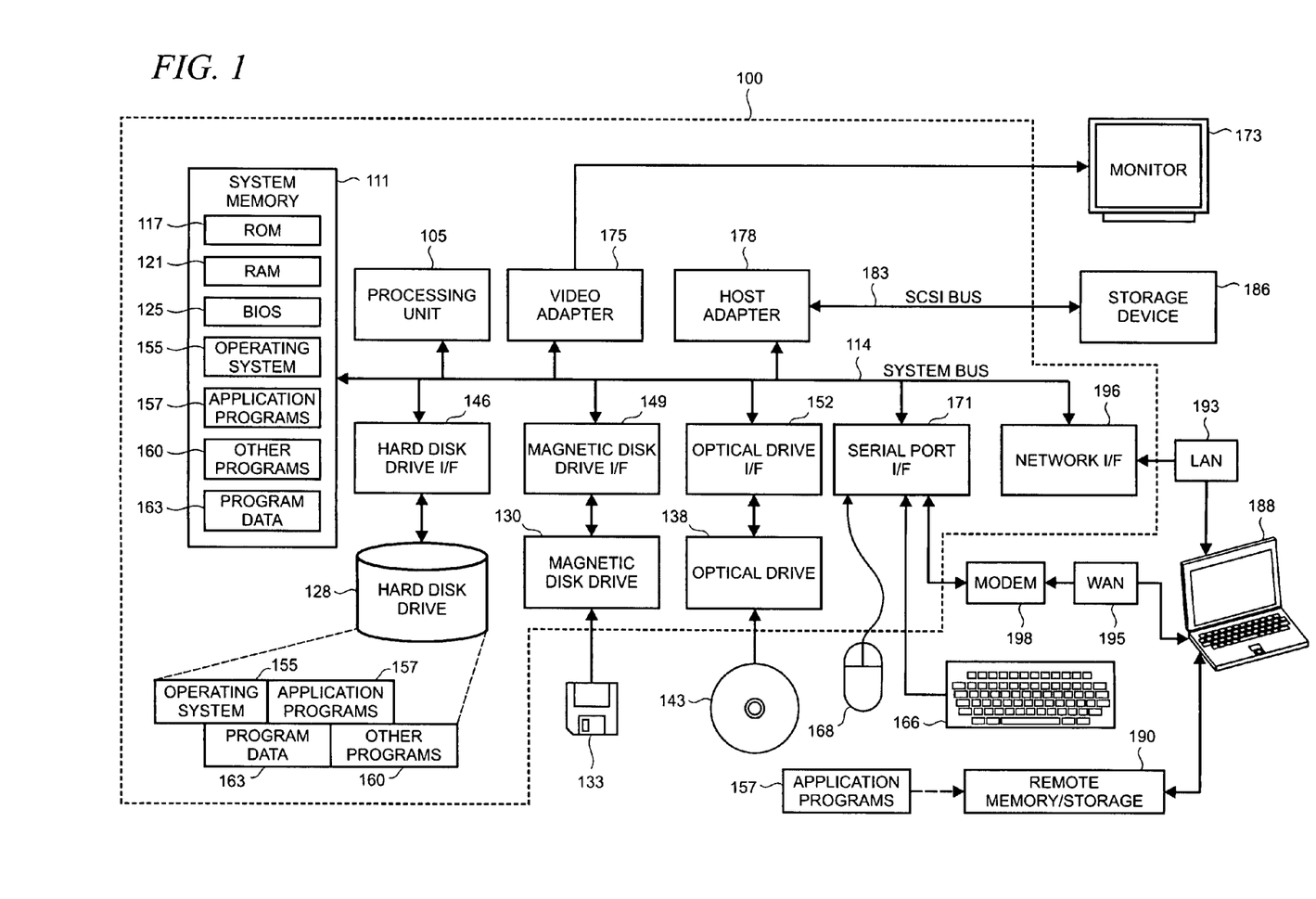
FIG. 1 is a simplified block diagram of an illustrative computer system environment in which the present multi-level read caching for transactional logging may be implemented.

Turning now to the drawings in which like reference numerals indicate like elements, FIG. 1 is a simplified block diagram of an illustrative computer system 100 such as a personal computer ("PC") or server with which the present multi-level read caching for transactional logging may be implemented. Computer system 100 includes a processing unit 105, a system memory 111, and a system bus 114 that couples various system components including the system memory 111 to the processing unit 105. The system bus 114 may be any of several types of bus structures including a memory bus or memory controller, a peripheral bus, and a local bus using any of a variety of bus architectures. The system memory 111 includes read only memory ("ROM") 117 and random access memory ("RAM") 121. A basic input/output system ("BIOS") 125, containing the basic routines that help to transfer information between elements within the computer system 100, such as during start up, is stored in ROM 117. The computer system 100 may further include a hard disk drive 128 for reading from and writing to an internally disposed hard disk (not shown), a magnetic disk drive 130 for reading from or writing to a removable magnetic disk 133 (e.g., a floppy disk), and an optical disk drive 138 for reading from or writing to a removable optical disk 143 such as a CD (compact disc), DVD (digital versatile disc) or other optical media. The hard disk drive 128, magnetic disk drive 130, and optical disk drive 138 are connected to the system bus 114 by a hard disk drive interface 146, a magnetic disk drive interface 149, and an optical drive interface 152, respectively. The drives and their associated computer readable media provide non-volatile storage of computer readable instructions, data structures, program modules and other data for the computer system 100. Although this illustrative example shows a hard disk, a removable magnetic disk 133 and a removable optical disk 143, other types of computer readable media which can store data that is accessible by a computer such as magnetic cassettes, flash memory cards, digital video disks, data cartridges, random access memories ("RAMs"), read only memories ("ROMs") and the like may also be used in some applications of the present dynamic database memory management. In addition, as used herein, the term computer readable medium includes one or more instances of a media type (e.g., one or more magnetic disks, one or more CDs, etc.).

A number of program modules may be stored on the hard disk, magnetic disk 133, optical disc 143, ROM 117 or RAM 121, including an operating system 155, one or more application programs 157, other program modules 160 and program data 163. A user may enter commands and information into the computer system 100 through input devices such as a keyboard 166 and pointing device 168 such as a mouse. Other input devices (not shown) may include a microphone, joystick, game pad, satellite disk, scanner or the like. These and other input devices are often connected to the processing unit 105 through a serial port interface 171 that is coupled to the system bus 114, but may be connected by other interfaces, such as a parallel port, game port or universal serial bus ("USB"). A monitor 173 or other type of display device is also connected to the system bus 114 via an interface, such as a video adapter 175. In addition to the monitor 173, personal computers typically include other peripheral output devices (not shown), such as speakers and printers. The illustrative example shown in FIG. 1 also includes a host adapter 178, a Small Computer System Interface ("SCSI") bus 183, and an external storage device 186 connected to the SCSI bus 183.

The computer system 100 is operable in a networked environment using logical connections to one or more remote computers, such as a remote computer 188. The remote computer 188 may be selected as another personal computer, a server, a router, a network PC, a peer device or other common network node, and typically includes many or all of the elements described above relative to the computer system 100, although only a single representative remote memory/storage device 190 is shown in FIG. 1. The logical connections depicted in FIG. 1 include a local area network ("LAN") 193 and a wide area network ("WAN") 195. Such networking environments are often deployed, for example, in offices, enterprise-wide computer networks, intranets and the Internet.

When used in a LAN networking environment, the computer 100 is connected to the local area network 193 through a network interface or adapter 196. When used in a WAN networking environment, the computer system 100 typically includes a broadband modem 198, network gateway or other means for establishing communications over the wide area network 195, such as the Internet. The broadband modem 198, which may be internal or external, is connected to the system bus 114 via the serial port interface 171. In a networked environment, program modules related to the computer system 100, or portions thereof, may be stored in the remote memory storage device 190. It is noted that the network connections shown in FIG. 1 are illustrative and other means of establishing a communications link between the computers may be used depending on the specific requirements of an application of database memory management.

Figure 2:
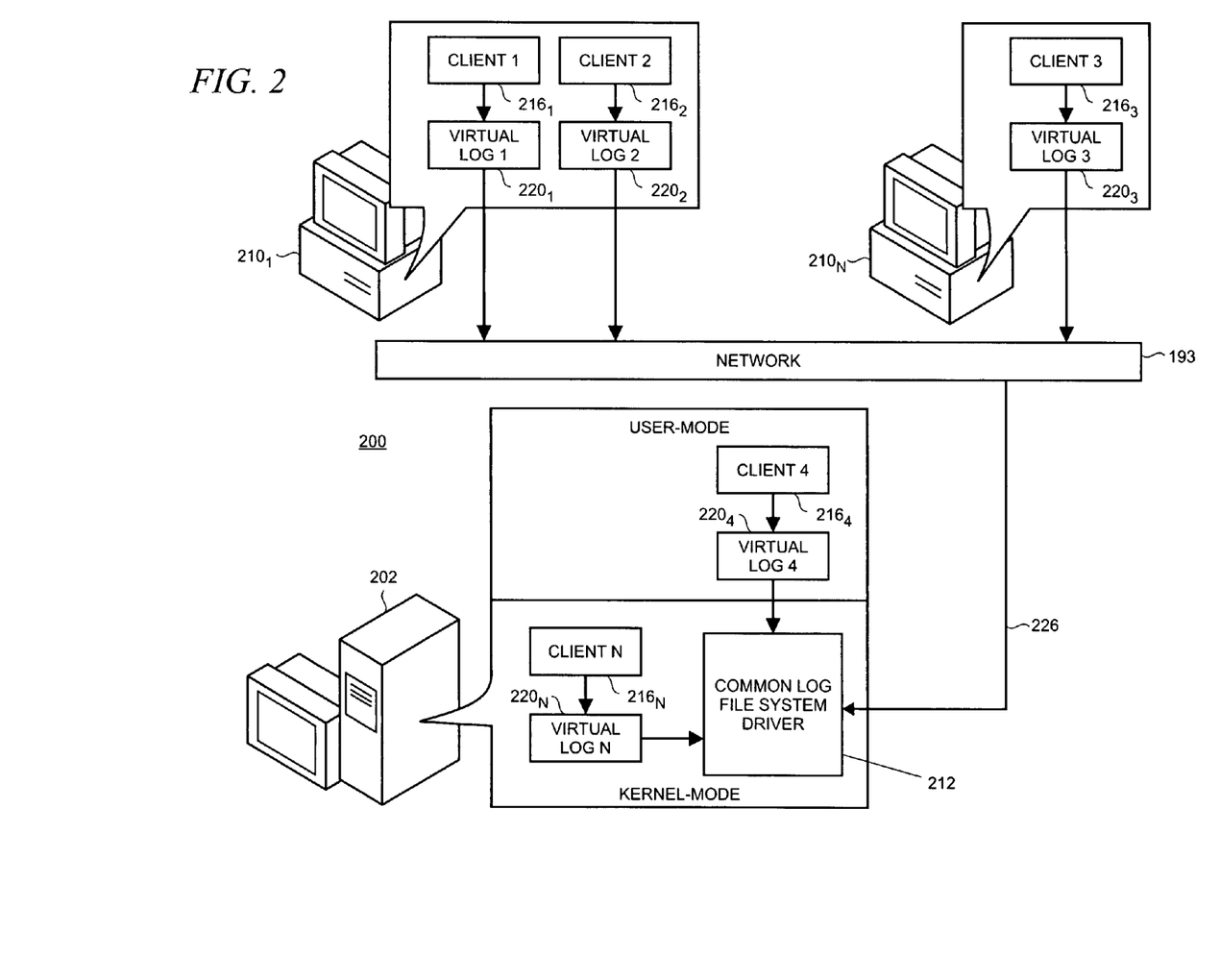
FIG. 2 is a pictorial view of an illustrative network environment in which the present multi-level read caching for transactional logging may be implemented.

FIG. 2 is a pictorial view of an illustrative network environment 200 in which the present multi-level read caching for transactional logging may be implemented. The illustrative network environment 200 shows a typical client-server type architecture that is used to implement one or more transactional systems. Such transactional systems typically include databases, transactions processing systems, and messaging systems. Event logging systems including event management systems that implement, for example, network event logging, threat analysis logging, and audit logging are also contemplated as being usable in some applications of the present multi-level read caching for transactional logging. In alternative arrangements, the network environment 200 is configurable to support peer-to-peer type architectures.

A server 202 communicates with a plurality of client computers $210_1 \ldots 210_N$ over a network (e.g., local area network 193 as shown in FIG. 1). Note, however, that remote logging by the client computers $210_{1-N}$ is an optionally utilized functionality as the present multi-level read caching for transactional logging is applicable to either local or remote logging, or combinations thereof. In this illustrative example, the server 202 and clients 210 are each implemented using a computer system that is arranged with similar features and functionalities as computer system 100 shown in FIG. 1 and described in the accompanying text. More specifically, server 202 is arranged to host an operating system that includes a kernel-mode driver which, in this illustrative example, is called a common log file system ("CLFS") driver 212.

CLFS driver 212 is a component that, in combination with kernel-mode and user-mode APIs (application programming interfaces) as described below, provides logging services to a number of log clients in the network environment 200. In this illustrative example, the provided logging services are ARIES-compliant. However, the CLFS driver 212 and associated APIs are not limited to supporting ARIES and may be used in a variety of logging scenarios.

Log clients 1, 2, 3 and N are indicated by reference numerals $216_{1-N}$ in FIG. 2. Log clients 216 may include applications, drivers, threads, or other units of software that use a transactional log.

Each log client $216_{1-N}$ is shown in FIG. 2 as having an associated virtual log $220_{1-N}$. The logs 220 are virtual in the sense that each log client 216 is provided with a log that appears and functions as a client's own dedicated log even though only a single, common physical log is managed by CLFS driver 212. In this illustrative example, the physical log contains multiplexed log records from the plurality of log clients 216. In most applications, such multiplexing provides an effective method for providing robust logging services on a memory-efficient basis and is thus generally preferred. In particular, the present paradigm overcomes many of the shortcomings of multiplexed transactional logging which have proven to be very difficult to address. Here, a single methodology may be consistently applied to either or both multiplexed and dedicated logs to advantageously provide high performing and flexible log caching to simultaneous user-mode and kernel-mode log clients. Although this illustrative example uses a multiplexed physical log file, the choice of usage of dedicated or multiplexed logs will typically be made according to the requirements of a specific application of transactional logging.

As shown in FIG. 2, virtual logs 1, 2, and 3 (indicated by reference numerals $220_{1-3}$) are coupled to the CLFS driver 212 at the kernel-mode level through network connection 226. In addition, the Nth client, $216_N$, is commonly disposed in server 202, and is coupled to, the CLFS driver 212 in kernel-mode. The 4th client $216_4$ is also commonly disposed in server 202, and is coupled to, the CLFS driver 212 in user-mode. Accordingly, log clients $216_{1-3, N}$ are considered kernel-mode log clients and log client $216_4$ is considered a user-mode client.

Figure 3:
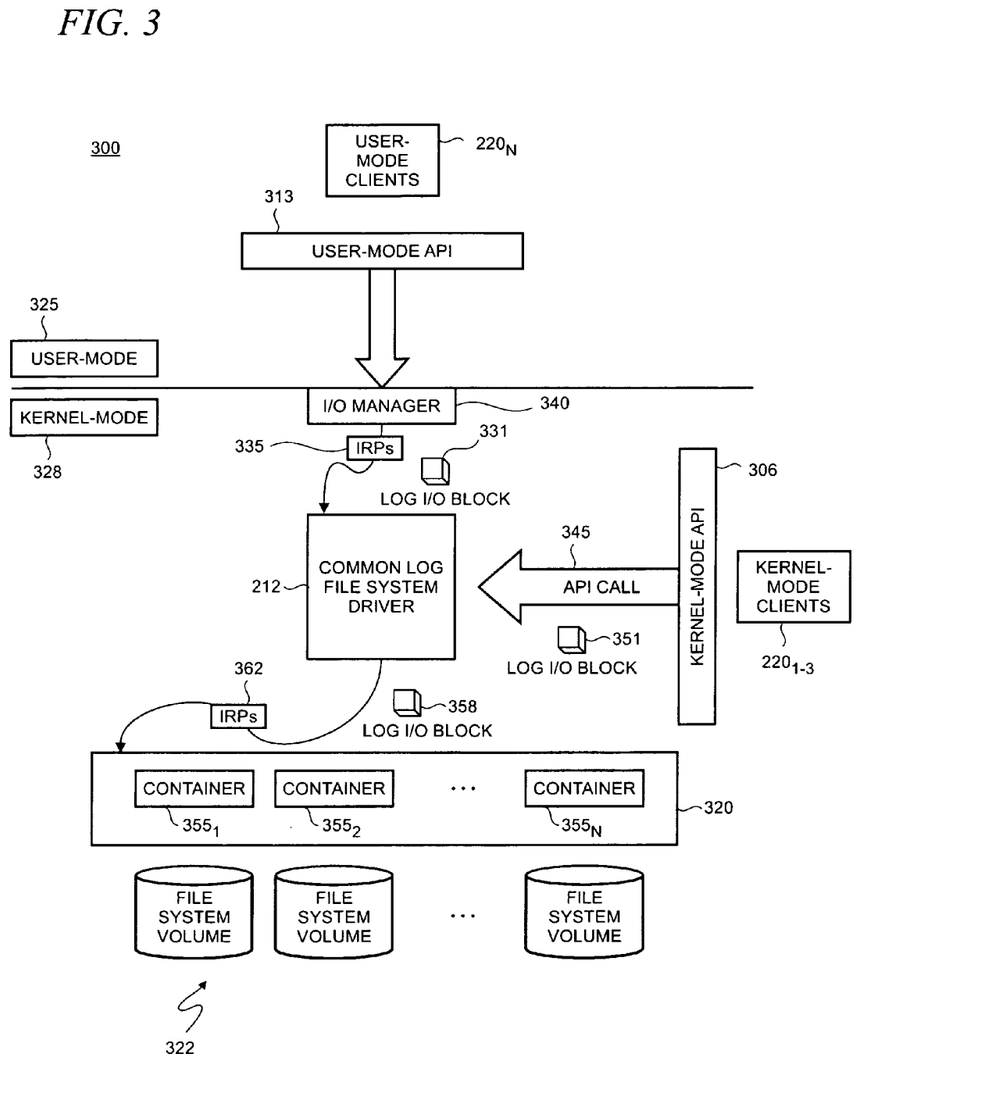
FIG. 3 is a block diagram of an illustrative common log file system architecture.

FIG. 3 is a block diagram of an illustrative common log file system architecture 300 comprising the CLFS driver 212, a kernel-mode API 306, a user-mode API 313, a physical log 320, and stable storage formed by a group of file system volumes 322. In this illustrative example, physical log 320 is a physical set of files and attributes that store one or many log streams. A log stream is a sequence of log records that a client logs. A log record is the basic unit of data that a log client can append to or read from a log.

CLFS architecture 300 functions to marshal log records generated by the log clients into virtual logs 220 (FIG. 2) and then reliably read them back. Log records in the virtual logs 220 are sequenced into log streams and written to stable storage in the form of log I/O blocks (which are buffers for the log records). The log clients 216 are thus enabled with the ability to accurately repeat history after recovery from a system failure or system restart. In addition, CLFS architecture 300 enables user-mode and kernel-mode clients to create/open log files, expand and shrink them, delete them, and marshal log records to and from client-defined buffers in a marshalling area. The marshalling area is an abstraction provided by APIs 306 and 313 to respective kernel-mode log clients and user-mode log clients.

Architecture 300 is divided into user-mode 325 and kernel-mode 328. Kernel-mode is the processor access mode in which operating system components and drivers run. Kernel-mode processes can directly access system data and hardware, and are not restricted like user-mode processes. Performance-sensitive drivers and services run in kernel mode to interact with hardware more efficiently. All kernel-mode components are fully protected from applications running in user mode.

User-mode is the processor access mode in which applications and subsystems run on the computer system (e.g., computer system 100 in FIG. 1) in user mode. Processes that run in user mode do so within their own virtual address spaces. They are restricted from gaining direct access to many parts of the system, including system hardware, memory not allocated for user-mode, and other portions of the system that might compromise system integrity.

CLFS architecture 300 is arranged to cleanly separate the marshalling function from the physical I/O to disk. This is accomplished by maintaining a separate marshalling area for each log client with its own address space. Marshaled log I/O blocks for each of the client's log files are queued for stable storage through a single, shared and centrally managed log flush queue (not shown). APIs 306 and 313 control the respective marshalling of log records into log I/O blocks and the migration of log I/O blocks to and from the log flush queue for kernel-mode and user-mode log clients.

In user-mode, the user-mode API 313 passes references to log I/O blocks (shown as a single representative log I/O block 331 in FIG. 3) to the log flush queue managed by CLFS driver 212 using I/O request packets 335 ("IRPs") on a log file handle to an I/O manager 340. CLFS driver 212 provides handlers for each type of I/O request and schedules the log I/O block on the log flush queue for writing to the physical log in the proper order across all the virtual logs 220. Kernel-mode operations are arranged, in this illustrative example, to bypass the I/O manager 340 and manipulate log file objects directly through the kernel-mode API 306 using an API call 345. Accordingly log I/O blocks (shown as a single representative log I/O block 351 in FIG. 3) from kernel-mode log clients are scheduled on the log flush queue.

An abstract object called a container is used to present an underlying file system, such as the NTFS file system in the Windows operating system, to the CLFS architecture 300 and log clients 216 to thereby normalize all I/O operations. Containers $355_{1-N}$ are utilized to form the logical sequential physical log. The file system may utilize one or more file system volumes 322 (that are physically implemented on one or more hard disk drives 128 in FIG. 1). Containers 355 are used to embody the physical log utilized in the present multi-level read caching arrangement for transactional logging as a logical single contiguous physical log 320. Use of the container abstraction advantageously enables any local or remote file system conforming with the Windows NT operating system I/O model to interoperate as the underlying file system supporting the CLFS architecture 300. Such interoperability reduces the need to embed volume management functionality in the CLFS driver 212 and streamlines the APIs 306 and 313.

CLFS driver 212 writes log I/O blocks (shown as a single representative log I/O block 358) into containers 355 using IRPs 362. The physical log 320 generally will comprise multiple discrete containers 355 and the CLFS driver 212 strings multiple containers together logically to form a single, logical, sequential disk extent to give the log clients 216 a logical view of single contiguous physical log stream.

For a given physical log, all containers 355 have the same size. A single container 355 provides a unit of growth or shrinkage of a physical log according to the log streams feeding it. Initially, at least two containers must be allocated to each log, but a log client 216 can dynamically grow or shrink a physical log by respectively adding containers to or deleting them from the physical log. Resizing the physical log involves minimal synchronization and performance overhead.

Figure 4:
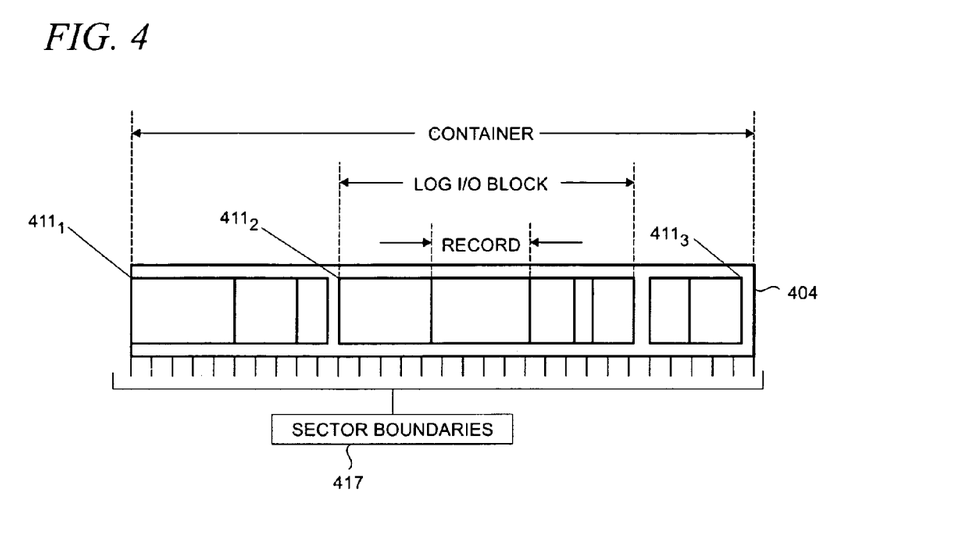
FIG. 4 is a block diagram showing details of an illustrative container structure for storing log records on a stable storage medium such as a disk.

FIG. 4 is a block diagram showing details of an illustrative container structure 404 for storing log records on a stable storage medium such as a disk. In this illustrative example, container 404 holds three log I/O blocks $411_{1-3}$. Log I/O block $411_1$ contains three variably-sized log records. Log I/O block $411_2$ contains five variably-sized log records. Log I/O block $411_3$ contains two variably-sized log records. As shown in FIG. 4, the beginning of each log I/O block 411 is always aligned with the beginning of a sector boundary 417 on the stable storage medium.

Figure 5:
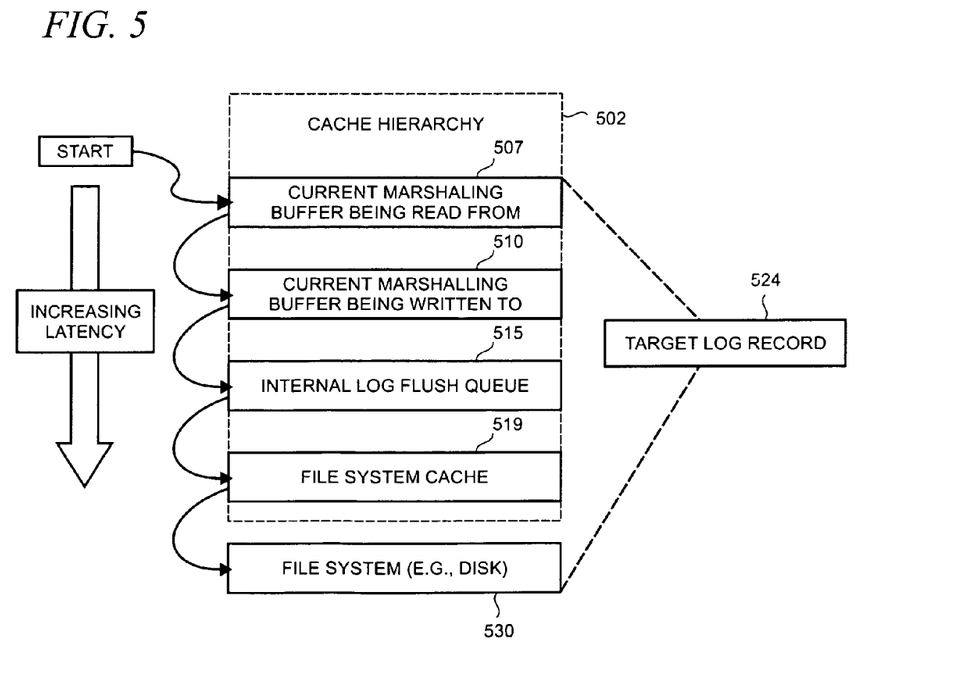
FIG. 5 is a block diagram of an illustrative cache hierarchy.

FIG. 5 is a block diagram of an illustrative cache hierarchy 502 that includes a sequence of caches that are implemented or utilized by the CLFS architecture 300 (FIG. 3). These caches include: 1) the current read buffer 507 in the marshalling area controlled by the kernel-mode API 306 and user-mode API 313; 2) the current write buffer 510 in the marshalling area (i.e., a buffer to which log records are currently being written, if any); 3) the shared log flush queue 515; and, 4) the file system cache 519. The caches are ordered by increasing cache latency (i.e., the amount of time since the occurrence of a transaction) in response to the recognition that transaction rollbacks tend to occur in the most recent transactions. Thus, caches towards the top of cache hierarchy 502 include log records for relatively more recent transactions while caches towards the bottom of the hierarchy include log records for relatively less recent transactions. A target log record 524 is read from a file system 530 (e.g., from disk) only when there are cache misses at all levels of the cache hierarchy 502.

Figure 6:
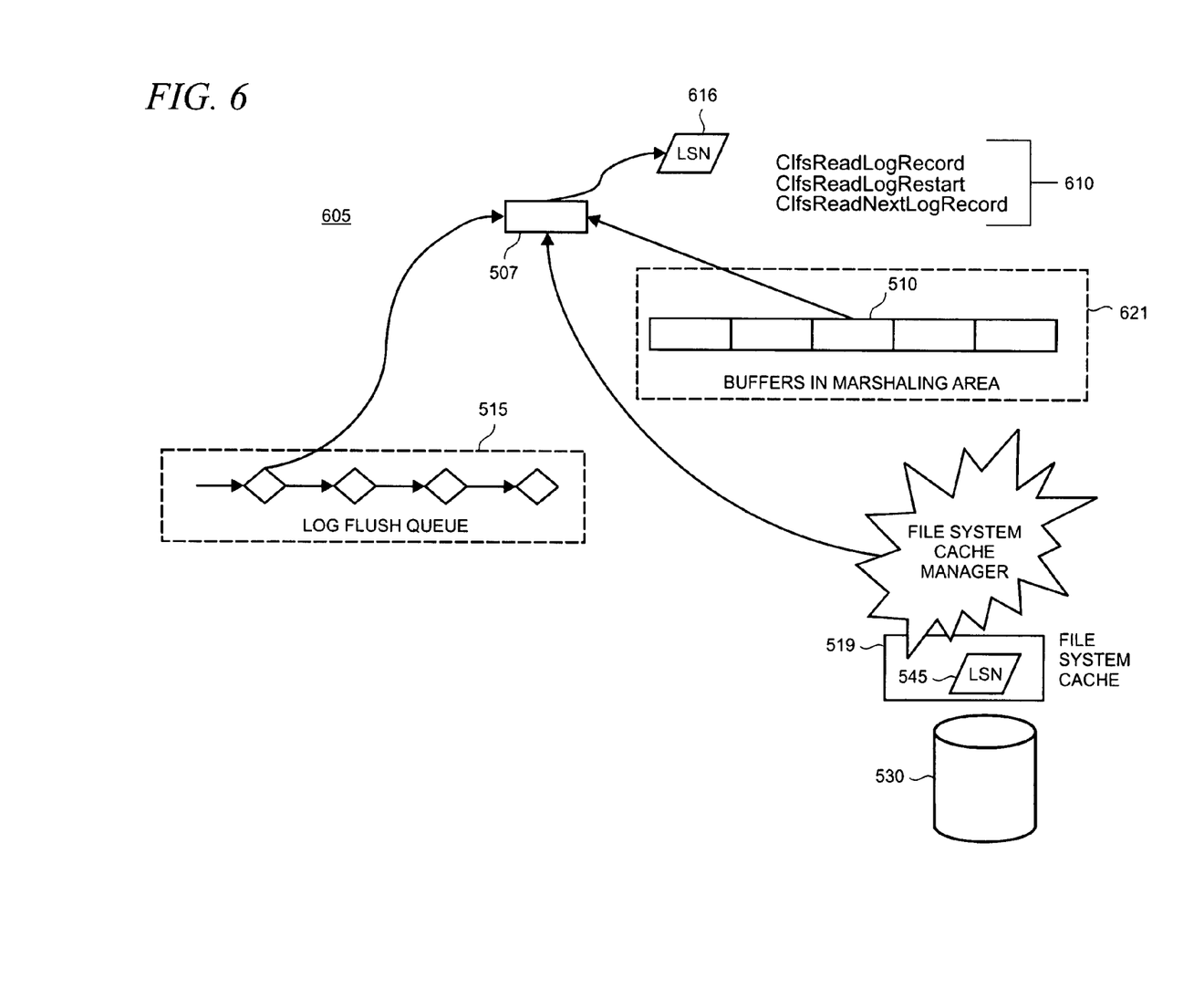
FIG. 6 is a diagram of an illustrative multi-level read caching for transactional logging methodology using the cache hierarchy shown in FIG. 5.

FIG. 6 is a diagram of an illustrative multi-level read caching for transactional logging methodology 605 using the cache hierarchy 502 shown in FIG. 5. As shown, when a log client (e.g., kernel mode clients $216_{1-3, N}$ or user-mode client $216_4$ in FIGS. 2 and 3) calls a CLFS function (collectively identified by reference numeral 610) to read a log record, read a log restart area, or follow a read cursor in a log to another log record, the CLFS driver 212 (FIG. 3) will attempt to find the target record 524 by sequentially querying the caches in hierarchy 502, stopping when the target record is found, or reading the target record 524 from disk if it is not located in any of the caches in the cache hierarchy.

All log records, including the target record 524, are identified by a log sequence number ("LSN") as indicated by reference numeral 616 in FIG. 6. Thus, when a log client writes a log record to a log stream, it gets back an LSN that identifies the log record for future use. The LSN is comprised of a set of three numbers which locates a record in a physical log: 1) a container identifier that identifies the container holding the log record; 2) a block offset that gives the byte offset, within the container, of the beginning of the log I/O block that holds the log record; and, 3) a record sequence number that identifies the record within the log I/O block. Due to the sequential nature of logs, LSNs are strictly arranged in a monotonically increasing, but non-contiguous, sequence of 64 bit integers. That is, the LSN assigned to a log record in a given log stream is always greater than the LSNs assigned to log records previously written to that same log stream.

Since the marshalling area 621 contains virtual logs, the current read buffer 507, and current write buffer 510 use virtual LSNs to identify log records cached therein. And, as the log flush queue 515 uses a projection of the buffers contained in the marshalling area 621, the top three cache levels in the cache hierarchy 502 do not require any form of LSN address translation for the log clients to correctly locate a requested target log record.

Figure 7:
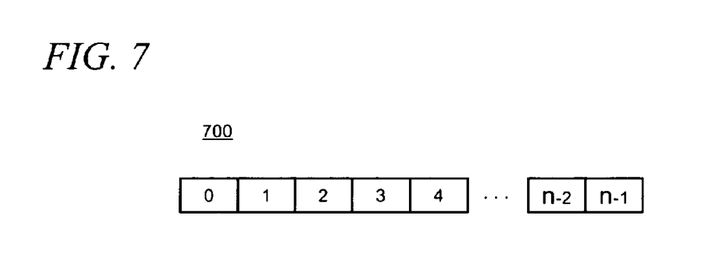
FIG. 7 shows an illustrative file system cache address space.

By contrast, a conversion algorithm is used in order to correctly identify a target log record using an LSN 545 that is cached in the system file cache 519. In addition, another conversion algorithm as described in U.S. Pat. No. 7,007,197 entitled "Virtual Logging System and Method" may be utilized to correctly identify the associated block location on disk. The former conversion is necessary because the non-contiguous nature of LSNs can create a "cache hole" in the contiguous file system cache address space as discussed below in the text accompanying FIGS. 7-12. FIG. 7 shows an illustrative file system cache address space 700 that includes contiguous addresses across pages of virtual memory. The contiguous addresses are included in the set of [0, n).

Figure 8:
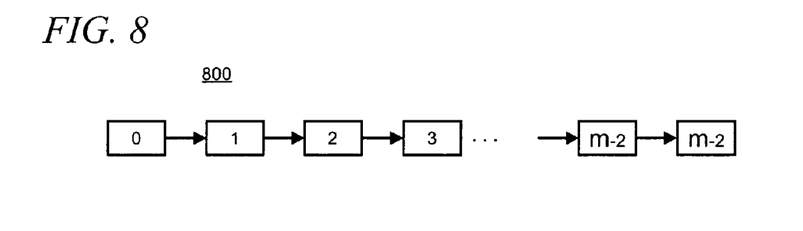
FIG. 8 is a block diagram of an illustrative physical log held in m containers.
Figure 9:
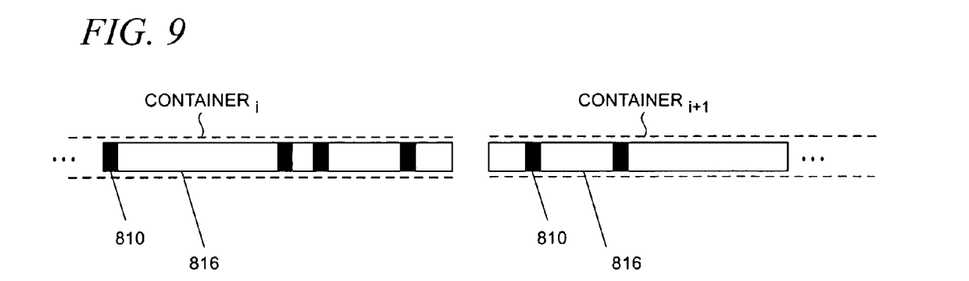
FIG. 9 shows several illustrative containers holding variably-sized log I/O blocks.

As shown in FIG. 8, a group of containers 800 (where one container was described above in the text accompanying FIG. 3) is illustratively provided having container addresses in the set [0, m). Containers 800 represent arbitrary file system files that are strung together by metadata data structures to represent a single logical sequential log medium. In FIG. 9, the $i^{th}$ container in group of containers 800 contains several fixed length log block headers 810 and several variable length log block data structures 816 as does the next container (i+1).

Figure 10:
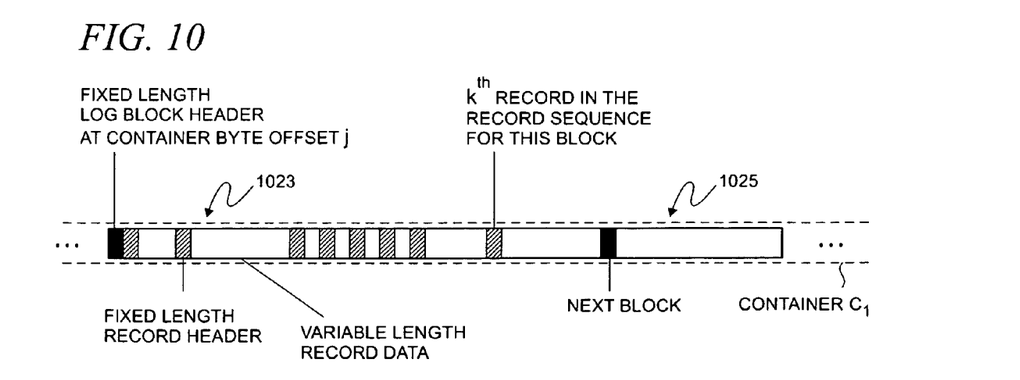
FIG. 10 shows an illustrative container with two log I/O blocks each having multiple log records.

FIG. 10 shows an illustrative container $C_i$ having multiple log records in two log I/O blocks. The LSN of the $k^{th}$ record, for a log I/O block 1023 at offset j, in container $C_i$ is LSN <ij,k> represented as a 64 bit integer ijk. For example, given an 0x7 and last record in container 0x41, whose sector aligned block begins at offset 0x00001600, its LSN is 0x0000004100001607. The LSN of the first record in the next log I/O block 1025 will be 0x0000004200000000. Thus, although these two log records are consecutive in the container, their LSN representations are not byte contiguous.

Figure 11:
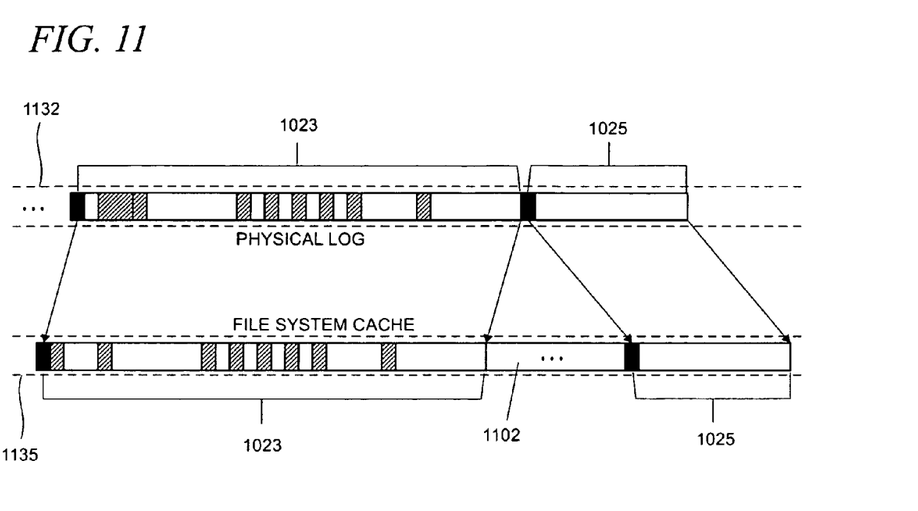
FIG. 11 is a diagram showing a cache hole that results from direct LSN (log sequence number) addressing into a file system cache.

As a result, as shown in FIG. 11, a cache hole 1102 would result from using the non-contiguous LSN addresses for the log I/O blocks 1023 and 1025 from physical log 1132 in a file system cache 1135 that uses a contiguous address space. Such cache hole 1102 could cause invalid reads from the file system cache 1135.

Figure 12:
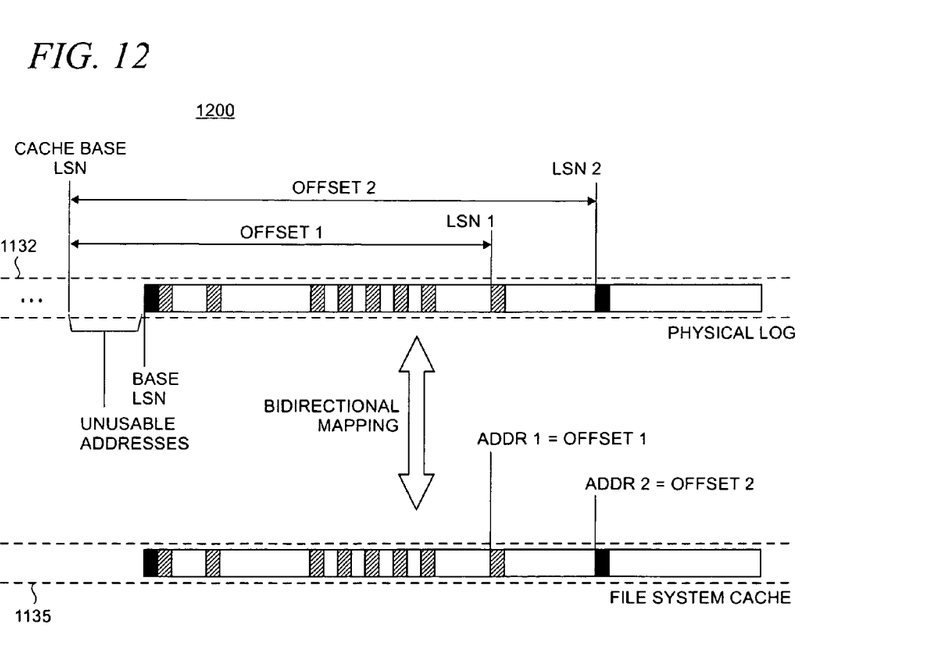
FIG. 12 is a diagram showing an illustrative arrangement for bidirectional mapping between an LSN address space and a file system cache address space.

A present solution to the problem of a cache hole is shown in FIG. 12 which depicts an illustrative arrangement 1200 for bidirectional mapping between an LSN address space and a file system cache address space. Here, a cache base LSN provides a reference point which is defined as being less than or equal to an LSN that defines the beginning of a physical log. This latter LSN is the lesser of a base LSN or archive tail LSN depending on the type of log being used. A base LSN is the LSN of the oldest record in a log stream that is still active (i.e., potentially needed by the log stream's log client). The log clients are responsible for updating the base LSN. An archive tail LSN is the LSN of the oldest record in a log stream for which archiving has not taken place. Not every log has an archive tail. A log that does not have an archive tail is called ephemeral, and a log that has an archive tail is called non-ephemeral. When a log client specifies that a log has an archive tail, the client is responsible for updating the archive tail. In the illustrative example shown in FIG. 12, a base LSN is used for an ephemeral-type log.

As shown in FIG. 12, a cache address Addr1 is determined by using an offset, measured in bytes, between the cache base LSN and a log record of interest in physical log 1132 having a physical log address LSN 1. Similarly a cache address Addr2 is the offset between the cache base LSN and another log record of interest having a physical log address of LSN 2. It is particularly noted that the mapping between the LSN address space and file system cache address space is bidirectional. That is, an LSN address for a log record is mapped to the file system cache 1135 during log writes to avoid the problem with cache holes. And, the file system cache address is mapped to an LSN address that is recognized by a log client if it needs to read the log record from the system file cache 1135.

As the base LSN moves forward as a result of log client operation, a gap of unusable addresses is created between the cache base LSN and base LSN. Periodically (e.g., on a lazy basis), the cache base LSN is advanced to close the gap when, for example, the offset and the resulting number of unusable addresses exceeds a predetermined threshold. In addition, since the file system cache addresses are based on the cache base LSN, it needs to be purged and repopulated whenever the cache base LSN is advanced. Accordingly, the cache base may be advanced to minimize the impact of the purging and repopulation on system resources, for example, by timing the advance during periods of relative system inactivity (i.e., when the file system is sufficiently acquiesced), or to tune the threshold for unusable addresses. Generally, the cache base LSN will be configured for advancement as necessary to strike a particular balance between performance management and memory management as dictated by specific circumstances.

Figure 13:
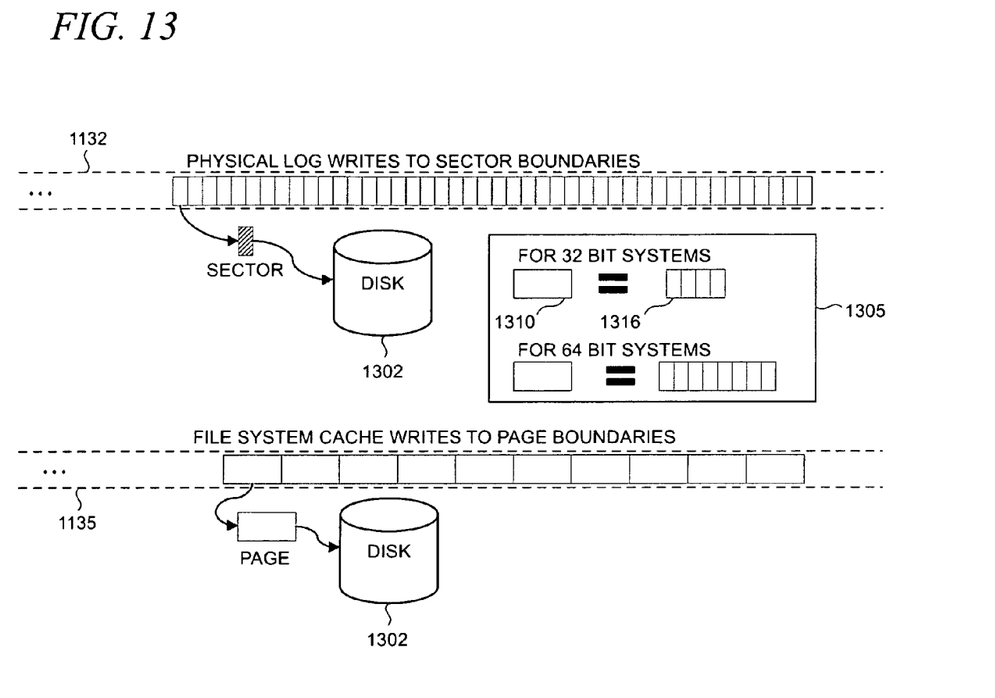
FIG. 13 is a diagram which illustrates the potential for mismatch between physical log sector boundaries and file system cache page boundaries.

Another issue that arises when using both a file system cache and physical log is the potential for mismatch between physical log boundaries and file system cache boundaries as shown in FIG. 13. As shown in FIG. 13 (and noted in the text accompanying FIG. 4), the physical log 1132 writes variable length log I/O blocks to sector boundaries on a disk 1302. By comparison, the file system cache 1135 performs all reads and writes on page boundaries. As shown in the key 1305, a page 1310 equals four sectors 1316 in systems using 32-bit processing and eight sectors 1316 in systems using 64-bit processing.

Figure 14:
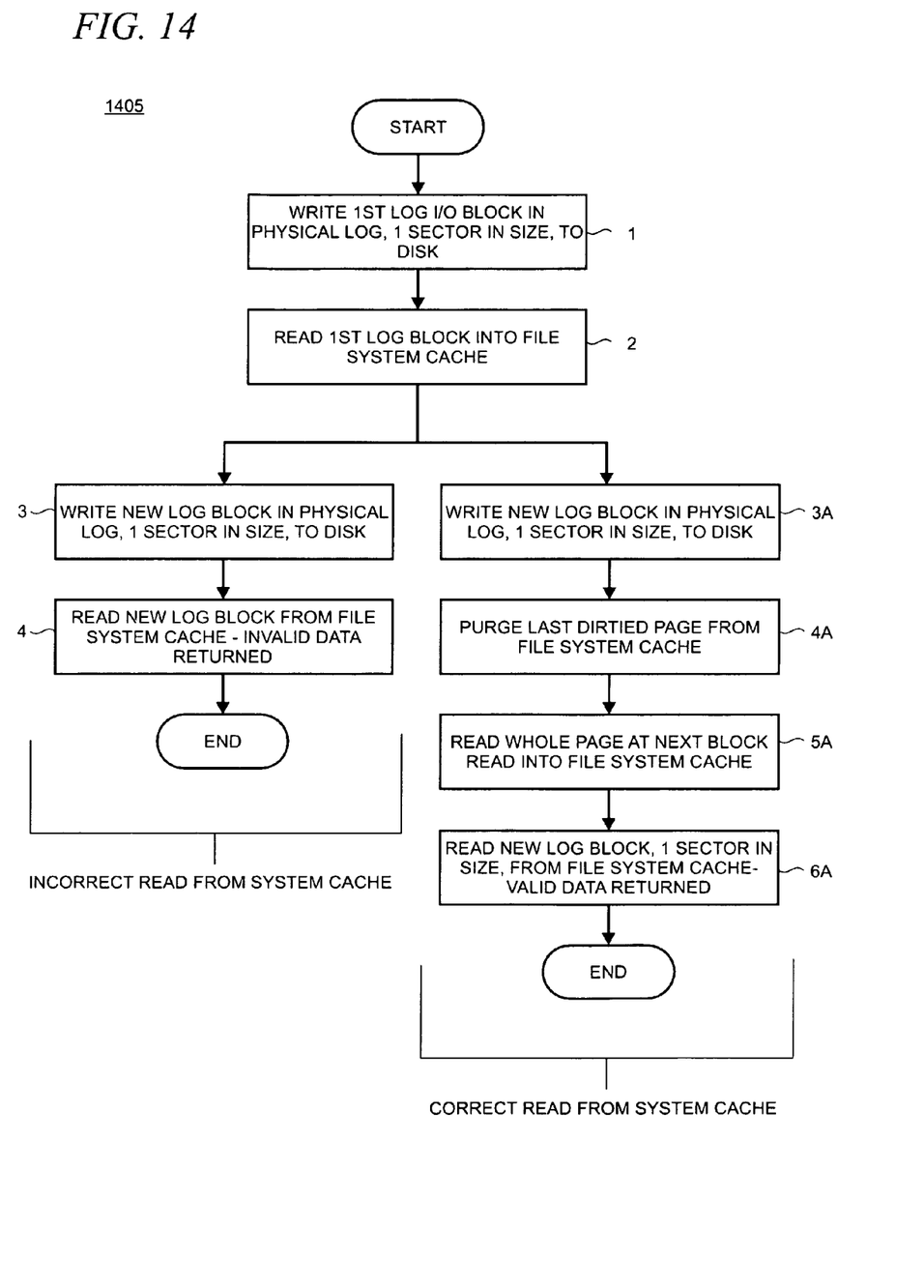
FIG. 14 is a flowchart of an illustrative method for managing the mismatch between physical log sector boundaries and file system cache page boundaries.

A present solution to the boundary mismatch is shown in the flowchart of FIG. 14 which provides an illustrative method 1405 for detecting a page misalignment on the last write to disk and accordingly purging the last dirtied (i.e., modified) page from the file system cache. Method 1405 is described with reference to FIGS. 15-18. Note that while illustrative method 1405 employs a case where a one sector block is utilized, the method may be applied to a partial page write of any size.

Figure 15:
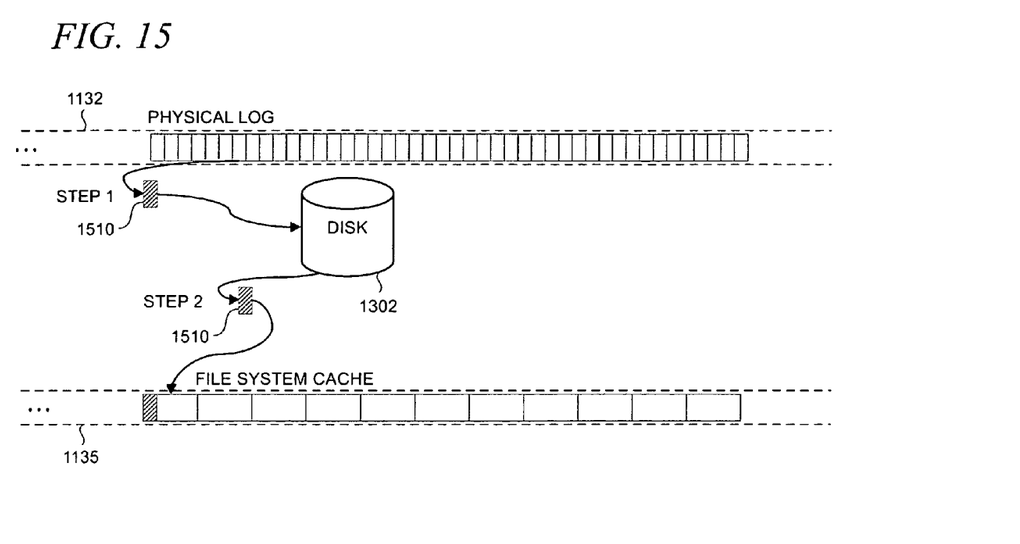
FIG. 15 is a diagram illustratively showing a write and read of a first log I/O block between a physical log on disk and a file system cache.

Step 1 in method 1405 includes writing a first log I/O block 1510 that is one sector in size into the physical log 1132 on disk 1302. Step 2 includes reading the first log I/O block 1510, which is one sector in size, into the file system cache 1135.

Figure 16:
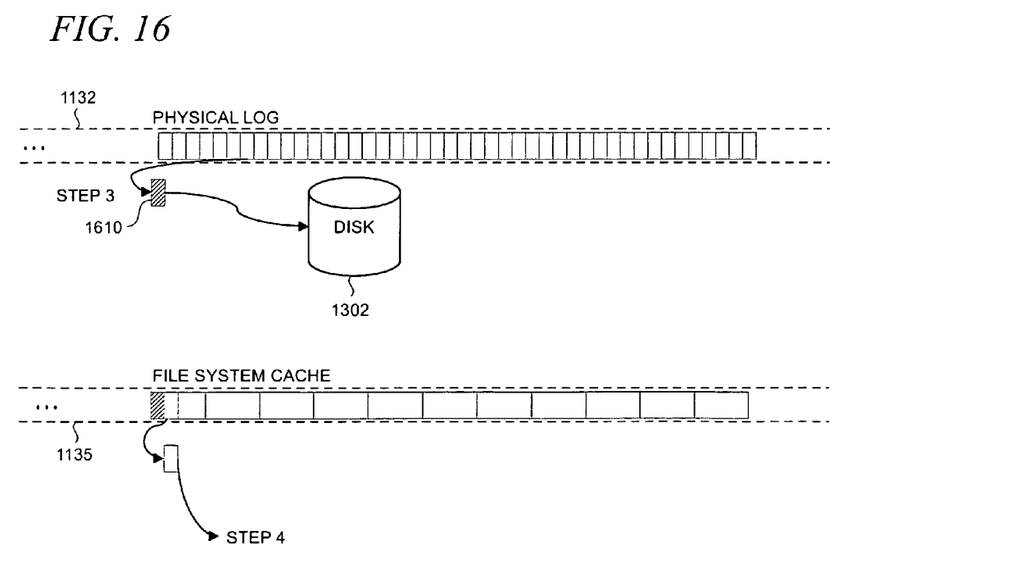
FIG. 16 is a diagram illustratively showing a write of a new log I/O block to a physical log on disk and an invalid return of the new I/O log block from the file system cache.

Referring now to the left-hand branch of flowchart 1405, steps 3 and 4 illustrate how a new log I/O block 1610 would be written and incorrectly read if the boundary mismatch issue were not appropriately addressed. Step 3 includes writing a new log I/O block 1610 that is one sector in size into the physical log 1132 on disk 1302. Step 4 includes attempting to read the new log I/O block (that is one sector in size) from the file system cache 1135. In this case, the file system cache 1135 will return invalid data because it believes that it has already read the correct page.

Figure 17:
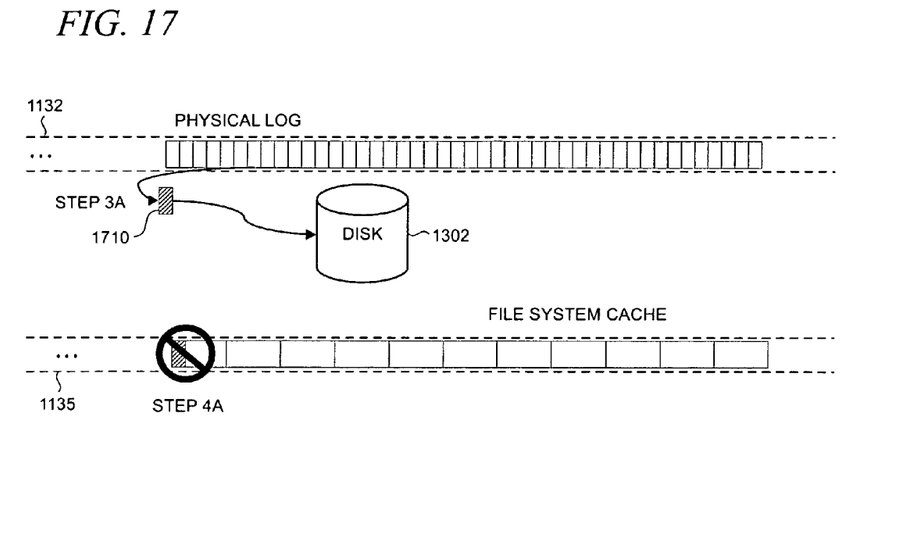
FIG. 17 is a diagram illustratively showing a write of a new log I/O block to a physical log on disk and a purge of the most recently dirtied page from the file system cache.
Figure 18:
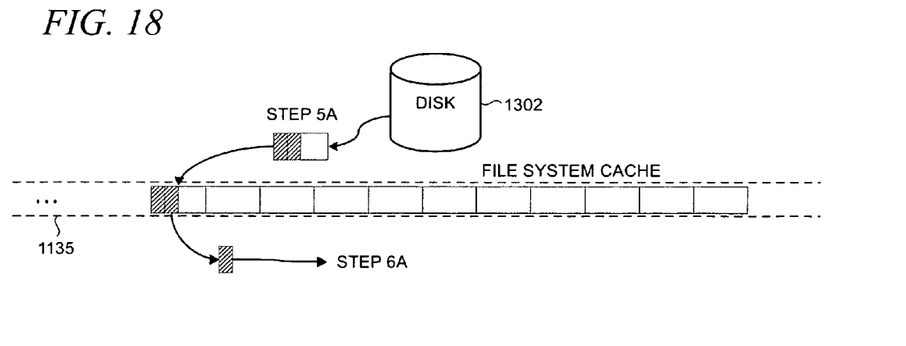
FIG. 18 is a diagram illustratively showing a repopulation of log I/O blocks to a file system cache and a valid return of a new I/O log block from the file system cache.

Referring now to the right-hand branch of flowchart 1405, steps 3A-6A illustrate how a new log I/O block 1710 is written and correctly read by addressing the boundary mismatch issue in accordance with the principles of the present multi-level caching arrangement. Step 3A includes writing the new log I/O block 1710, one sector in size, to the physical log 1132 on disk 1302. Step 4A includes purging the last dirtied (i.e., modified) page in the system file cache 1135. Step 5A includes reading a whole page into the file system cache on the next log I/O block read. Step 6A includes reading the new log I/O block (that is one sector in size) from the file system cache 1135. In this case now, the file system cache 1135 will return valid data for the new log I/O block 1710.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a kernel-mode driver for utilizing a file system cache for caching a physical log comprising a plurality of log records, each log record being identified with a log sequence number (LSN), the method comprising the steps of:
    maintaining a beginning LSN, the beginning LSN identifying a temporal beginning to the physical log, wherein the beginning LSN is a minimum of a base LSN or an archive tail LSN, the base LSN being associated with a log record that is oldest among the plurality of log records and active in the physical log, and the archive tail LSN being associated with a log record that is oldest among the plurality of log records in the physical log for which archiving has not occurred;
    maintaining a cache base LSN that is less than or equal to the beginning LSN;
    mapping an LSN of a log record to an address in the file system cache by generating a cache address for the log record that is substantially equal to an offset between the cache base LSN and the LSN of the log record; and
    advancing the cache base LSN when an offset to the beginning LSN exceeds a predetermined threshold for unusable cache addresses.

2. The method of claim 1 in which the physical log is purged when the cache base LSN is advanced.

3. The method of claim 1 in which the offset between the cache base LSN and the LSN of the log record is dimensioned in bytes.

* * * * *